United States Patent

Ethridge et al.

[11] Patent Number: 6,079,709
[45] Date of Patent: Jun. 27, 2000

[54] SCREEN SEGMENT, VIEWING ISOLATION APPARATUS

[76] Inventors: Michael Ethridge; Jodie Ethridge, both of 11001 NE. 88th St., Vancouver, Wash. 98662

[21] Appl. No.: 09/330,325

[22] Filed: Jun. 11, 1999

Related U.S. Application Data

[60] Provisional application No. 60/089,447, Jun. 16, 1998.

[51] Int. Cl.[7] .................................................. A63F 9/22
[52] U.S. Cl. ........................................ 273/148 B; 463/47
[58] Field of Search ...................... 273/148 B, DIG. 28; 463/30, 31, 34, 47; 345/1, 2, 4; 348/744, 776, 781, 782, 787, 788

[56] References Cited

U.S. PATENT DOCUMENTS

| | | | |
|---|---|---|---|
| 4,734,779 | 3/1988 | Levis et al. | 358/231 |
| 5,288,078 | 2/1994 | Copper et al. | |
| 5,354,202 | 10/1994 | Moncrief et al. | |
| 5,435,557 | 7/1995 | Coffey | |
| 5,538,255 | 7/1996 | Barker | |
| 5,688,174 | 11/1997 | Kennedy | |
| 5,965,000 | 9/1999 | Kreitman et al. | 345/1 |

*Primary Examiner*—Jessica J. Harrison
*Assistant Examiner*—Julie Kasick

[57] ABSTRACT

A screen segment, viewing isolation apparatus is provided for a video screen that is divided up into plural screen segments and includes a housing which includes a plurality of optical channels, wherein each of the optical channels is registrable with a respective screen segment. When a video screen is divided into four screen segments, four players can employ an embodiment of the invention to see their respective screen segments without being confused by screen segments of other players. An embodiment of the invention that accommodates four players can be converted into an embodiment which accommodates two players for separately viewing two screen segments. The housing includes a top housing wall, a bottom housing wall, and exterior wall supports connected between the top housing wall and the bottom housing wall. An interior vertical partition is connected between the top housing wall and the bottom housing wall at medial positions of the top housing wall and the bottom housing wall. An interior horizontal partition is connected between the exterior wall supports at medial positions of the exterior wall supports. An intermediate wall panel is connected between the top housing wall and the bottom housing wall and is connected to the interior vertical partition. A plurality of optical channels are formed inside the housing for viewing a plurality of respective screen segments.

14 Claims, 4 Drawing Sheets

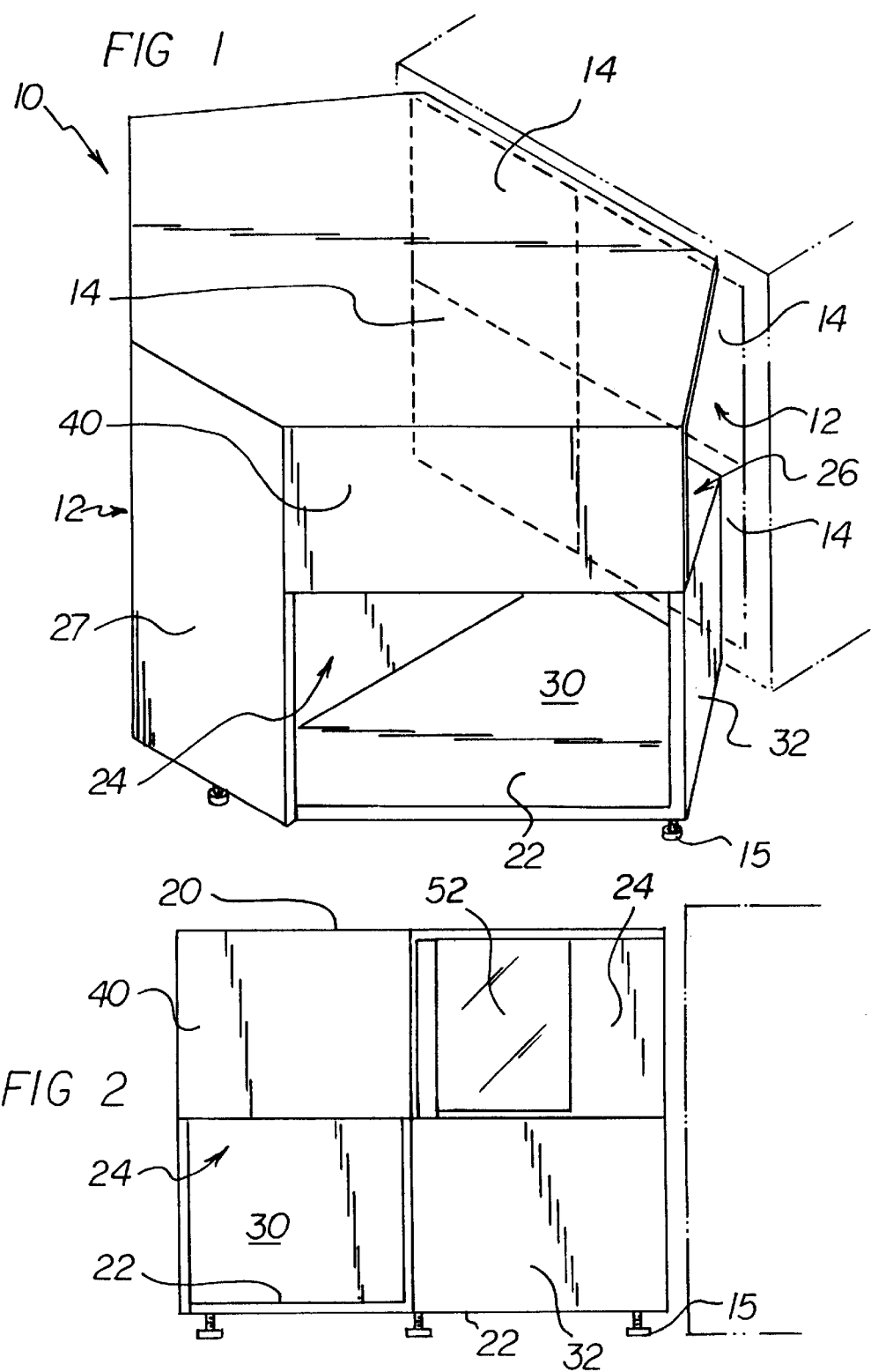

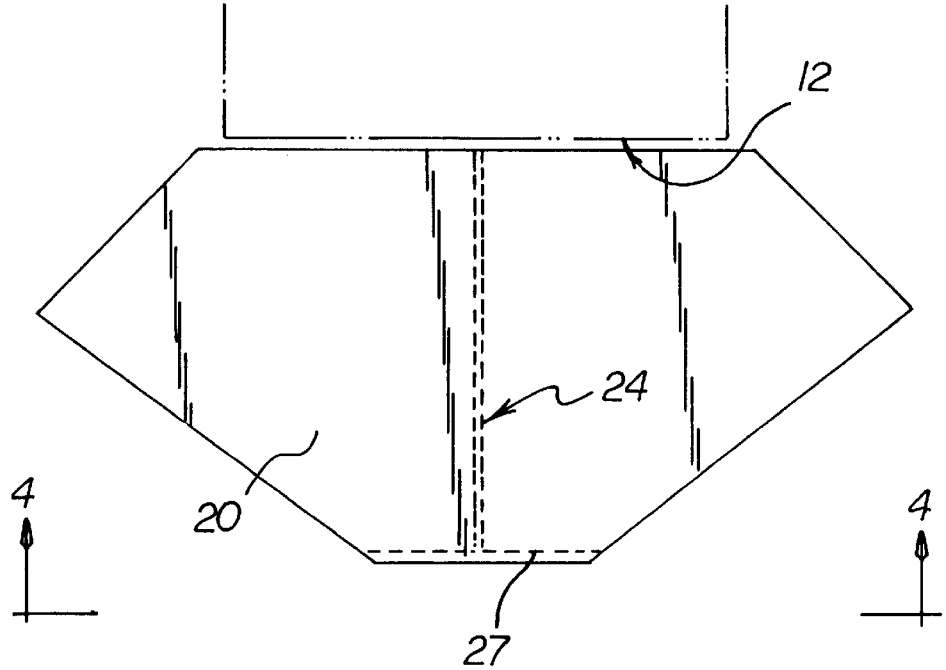
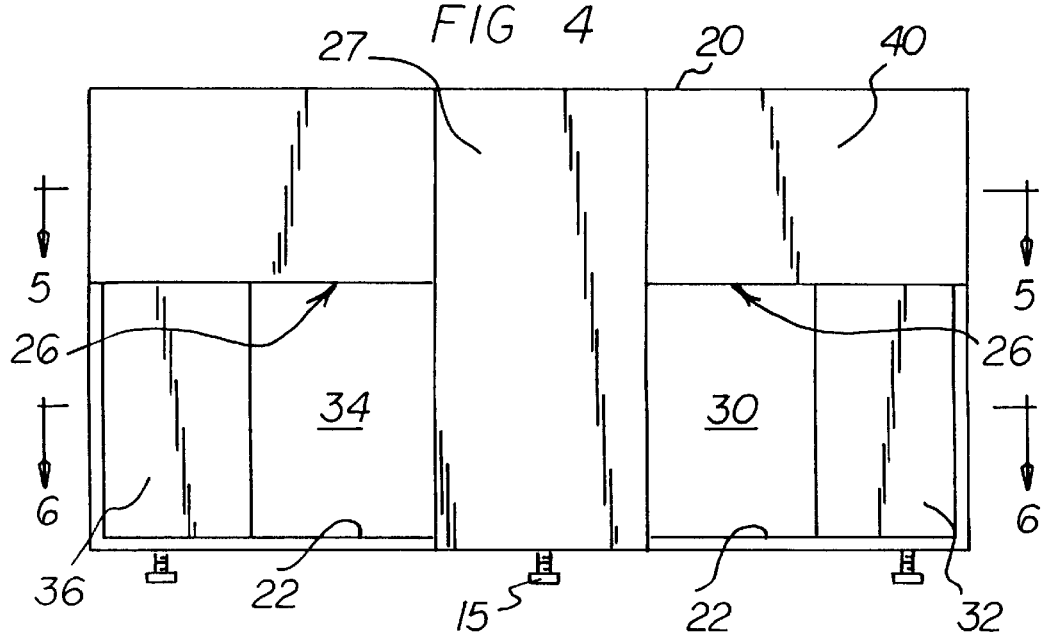

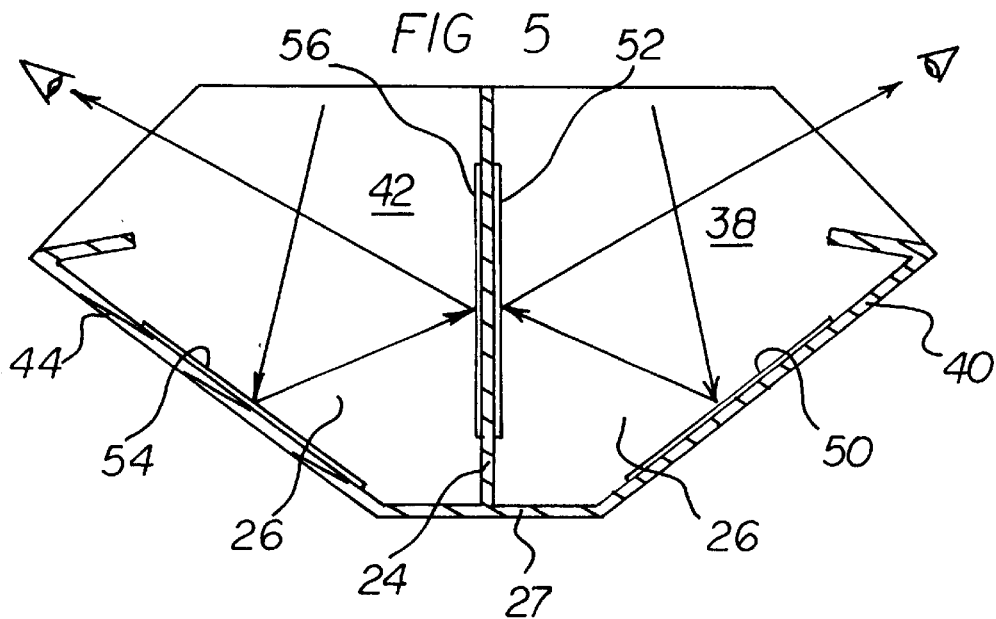
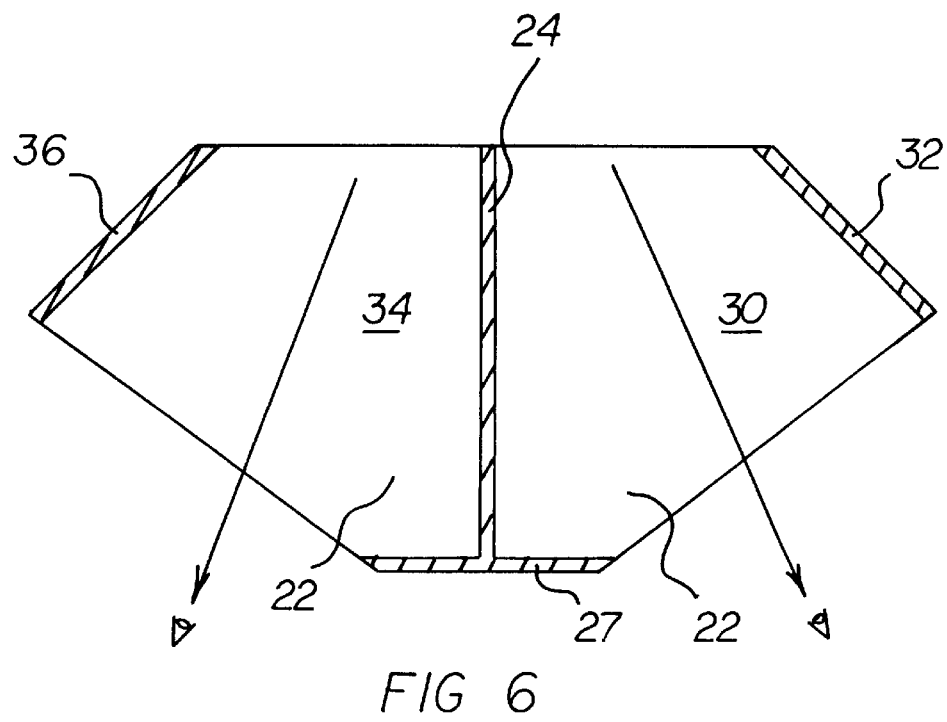

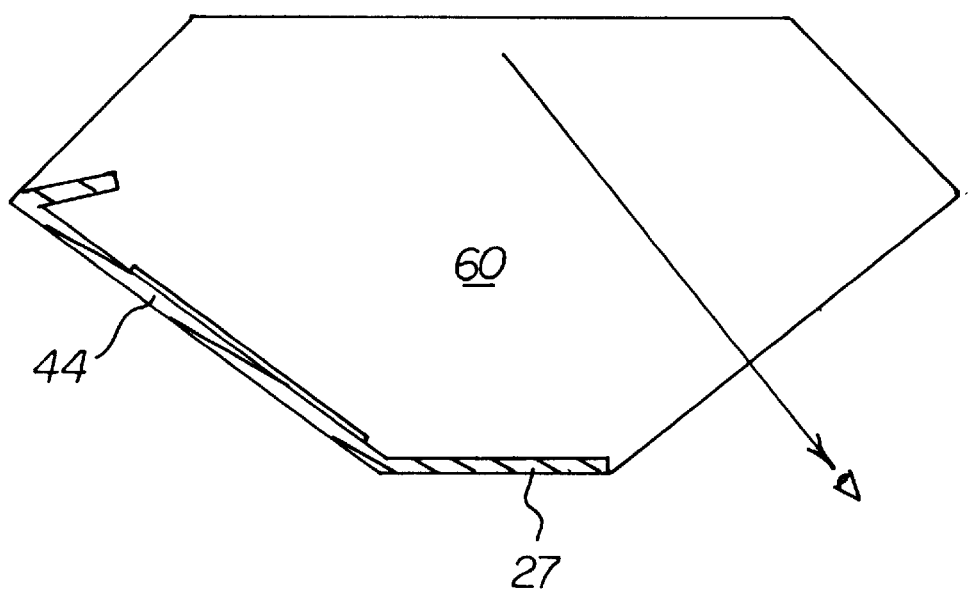
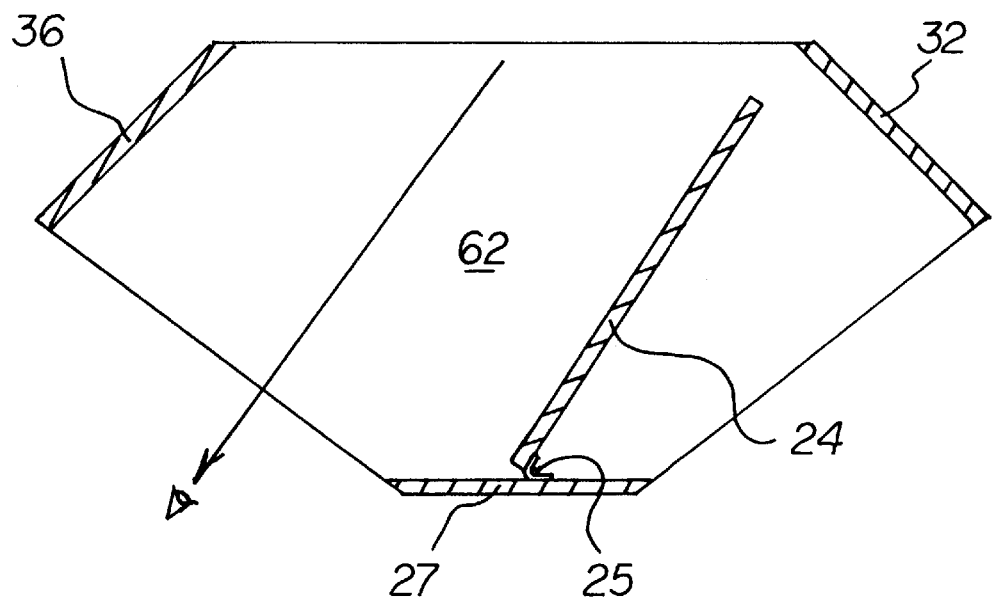

SCREEN SEGMENT, VIEWING ISOLATION APPARATUS

CROSS-REFERENCE TO RELATED APPLICATION

This application claims priority based upon my prior Provisional Application Ser. No. 60/089,447, filed Jun. 16, 1998, now abandoned.

BACKGROUND OF THE INVENTION

1. Field of the Invention

The present invention relates generally to viewing screens and, more particularly, to viewing screens on which video games are displayed.

2. Description of the Prior Art

The playing of video games and the viewing thereof on video screens is well known. A type of video game is well known in which a plurality of players compete against one another in real-time. Throughout the years, a number of innovations have been developed relating to video games in which multiple players play in real-time, and the following U.S. patents are representative of some of those innovations: U.S. Pat. Nos. 5,435,557, 5,538,255, and 5,688,174. More specifically, U.S. Pat. No. 5,435,557 discloses a divider for a video screen in which it is required for the screen divider to be attached to either the CRT or the cabinet for the CRT. Requiring an attachment of a screen divider to either a CRT or a CRT cabinet may cause damage to either the CRT or the cabinet. In this respect, it would be desirable if a divider for a video screen is not attached to either a CRT or a CRT cabinet.

U.S. Pat. No. 5,538,255 discloses a remote controlled multiplayer video game in which a plurality of players are at locations remote from one another. In this respect, a plurality of remote video screens are employed. With some multiplayer video games, however, it is desirable for the players to be present at the same location and to use the same video screen, albeit divided into separately viewable segments.

U.S. Pat. No. 5,688,174 discloses a multiplayer interactive video gaming device in which a single, non-segmented monitor is employed for a plurality players. The display on the monitor is similar to a blackjack table in a casino. Other than retaining hidden cards, actions taken by all players are visible to all other players, just like at a blackjack table. Each of the individual players' input goes through a single port in sequence. That is, individual players do not take actions simultaneously, but only in sequence. In contrast with a fast paced video game, plural players are placing plural inputs simultaneously. In this respect, it would be desirable if a screen segment, viewing isolation apparatus were provided that permits plural players to play simultaneously.

In addition, the following U.S. patents may also be of interest. U.S. Pat. No. 5,288,078 discloses a control interface apparatus that permits a boxing motions of a person's arms to be translated onto a monitor. U.S. Pat. No. 5,345,202 discloses a driver training system that permits a subsequent trainee to match one's driving skills against another trainee who participated earlier.

Still other features would be desirable in a screen segment, viewing isolation apparatus. For example, the surface area of a monitor is relatively small compared to the frontal surface area of a person. Consequently, it is difficult for a number of persons to stand in front of a monitor and have a good view without crowding one another. In this respect, it would be desirable if a monitor viewing apparatus were provided which permits a number of persons to view a monitor without crowding one another.

Thus, while the foregoing body of prior art indicates it to be well known to use video games for multiple users, the prior art described above does not teach or suggest a monitor screen segment, viewing isolation apparatus which has the following combination of desirable features: (1) is not attached to either a CRT or a CRT cabinet; (2) permits plural players to be present at the same location and to use the same video screen that is divided into separately viewable segments; (3) permits plural players to play simultaneously; and (4) permits a number of persons to view a monitor without crowding one another. The foregoing desired characteristics are provided by the unique screen segment, viewing isolation apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a screen segment, viewing isolation apparatus for a video screen that is divided up into plural screen segments and includes a housing which includes a plurality of optical channels, wherein each of the optical channels is registrable with a respective screen segment. When a video screen is divided into four screen segments, four players can employ an embodiment of the invention to see their respective screen segments without being confused by screen segments of other players. An embodiment of the invention that accommodates four players can be converted into an embodiment which accommodates two players for separately viewing two screen segments.

The housing includes a top housing wall, a bottom housing wall, and exterior wall supports connected between the top housing wall and the bottom housing wall. An interior vertical partition is connected between the top housing wall and the bottom housing wall at medial positions of the top housing wall and the bottom housing wall. An interior horizontal partition is connected between the exterior wall supports at medial positions of the exterior wall supports. An intermediate wall panel is connected between the top housing wall and the bottom housing wall and is connected to the interior vertical partition.

A first optical channel is formed by a first portion of the bottom housing wall, a lower portion of the interior vertical partition, a first portion of the interior horizontal partition, and a first exterior wall support in the form of a first wall panel. The first optical channel provides a direct view of a first screen segment from in front of the first screen segment.

A second optical channel is formed by a second portion of the bottom housing wall, a lower portion of the interior vertical partition, a second portion of the interior horizontal partition, and a second exterior wall support in the form of a second wall panel. The second optical channel provides a direct view of a second screen segment from in front of the second screen segment.

A third optical channel is formed by a first portion of the top housing wall, an upper portion of the interior vertical partition, the first portion of the interior horizontal partition, a third exterior wall support in the form of a third wall panel, a first image-reversing mirror attached to an interior side of the third wall panel, and a second image-reversing mirror, and a second image-reversing mirror attached to a first interior side of the interior vertical partition. The third optical channel provides an indirect view of a third screen segment to the side of or to the rear of the third screen segment.

A fourth optical channel is formed by a second portion of the top housing wall, the upper portion of the interior vertical partition, the second portion of the interior horizontal partition, a fourth exterior wall support in the form of a fourth wall panel, a third image-reversing mirror attached an interior side of the fourth wall panel, and a fourth image-reversing mirror attached to a second interior side of the interior vertical partition. The fourth optical channel provides an indirect view of a fourth screen segment to the side of or to rear of the fourth screen segment.

The upper portion of the interior vertical partition is removable, the third wall panel is removable, and the lower portion of the interior vertical partition is connected by a hinge to intermediate wall panel.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved screen segment, viewing isolation apparatus which has all of the advantages of the prior art and none of the disadvantages.

It is another object of the present invention to provide a new and improved screen segment, viewing isolation apparatus which may be easily and efficiently manufactured and marketed. It is a further object of the present invention to provide a new and improved screen segment, viewing isolation apparatus which is of durable and reliable construction.

An even further object of the present invention is to provide a new and improved screen segment, viewing isolation apparatus which is susceptible of a low cost of manufacture with regard to both materials and labor, and which accordingly is then susceptible of low prices of sale to the consuming public, thereby making such screen segment, viewing isolation apparatus available to the buying public.

Still yet a further object of the present invention is to provide a new and improved screen segment, viewing isolation apparatus which is not attached to either a CRT or a CRT cabinet.

Still another object of the present invention is to provide a new and improved screen segment, viewing isolation apparatus that permits plural players to be present at the same location and to use the same video screen that is divided into separately viewable segments.

Yet another object of the present invention is to provide a new and improved screen segment, viewing isolation apparatus which permits plural players to play simultaneously.

Even another object of the present invention is to provide a new and improved screen segment, viewing isolation apparatus that permits a number of persons to view a monitor without crowding one another.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the screen segment, viewing isolation apparatus of the invention placed adjacent to a video screen which is segmented into four viewing areas.

FIG. 2 is a side view of the embodiment of the screen segment, viewing isolation apparatus shown in FIG. 1.

FIG. 3 is a top view of the embodiment of the screen segment, viewing isolation apparatus of FIG. 1.

FIG. 4 is a front view of the embodiment of the invention shown in FIG. 3 taken along line 4—4 thereof.

FIG. 5 is a cross-sectional view of the embodiment of the invention shown in FIG. 4 taken along line 5—5 thereof.

FIG. 6 is a cross-sectional view of the embodiment of the invention shown in FIG. 4 taken along line 6—6 thereof.

FIG. 7 is a cross-sectional view of a top portion of a second embodiment of the invention for view a video screen which is segmented into two viewing areas, one on top of the other.

FIG. 8 is a cross-sectional view of a bottom portion of a second embodiment of the invention for view a video screen which is segmented into two viewing areas, one on top of the other.

DESCRIPTION OF THE PREFERRED EMBODIMENT

With reference to the drawings, a new and improved screen segment, viewing isolation apparatus embodying the principles and concepts of the present invention will be described.

Turning to FIGS. 1–6, a first embodiment of the screen segment, viewing isolation apparatus is shown for a video screen that is segmented into four screen segments, wherein each screen segment occupies a quadrant of the screen. In the first embodiment, the screen segment, viewing isolation apparatus 10 includes a housing 16 which includes a plurality of optical channels, wherein each of the optical channels is registrable with a respective screen segment 14. With a video screen 12 divided into four screen segments 14, four players can employ an embodiment of the invention to see their respective screen segments 14 without being confused by screen segments 14 of other players.

In general, the housing 16 includes a top housing wall 20, a bottom housing wall 22, and exterior wall supports connected between the top housing wall 20 and the bottom housing wall 22. An interior vertical partition 24 is connected between the top housing wall 20 and the bottom housing wall 22 at medial positions of the top housing wall 20 and the bottom housing wall 22. An interior horizontal partition 26 is connected between the exterior wall supports at medial positions of the exterior wall supports. An intermediate wall panel 27 is connected between the top housing wall 20 and the bottom housing wall 22 and is connected to the interior vertical partition 24.

For a video screen 12 that is divided into four screen segments 14 wherein each of the four screen segments 14 occupies a quadrant of the video screen 12, first optical channel 30 is formed by a first portion of the bottom housing wall 22, a lower portion of the interior vertical partition 24, a first portion of the interior horizontal partition 26, and a first exterior wall support in the form of a first wall panel 32. The first optical channel 30 provides a direct view of a first screen segment 14 from in front of the first screen segment 14.

A second optical channel 34 is formed by a second portion of the bottom housing wall 22, a lower portion of the interior vertical partition 24, a second portion of the interior horizontal partition 26, and a second exterior wall support in the form of a second wall panel 36. The second optical channel 34 provides a direct view of a second screen segment 14 from in front of the second screen segment 14.

A third optical channel 38 is formed by a first portion of the top housing wall 20, an upper portion of the interior vertical partition 24, the first portion of the interior horizontal partition 26, a third exterior wall support in the form of a third wall panel 40, a first image-reversing mirror 50 attached to an interior side of the third wall panel 40, and a second image-reversing mirror 52, and a second image-reversing mirror 52 attached to a first interior side of the interior vertical partition 24. The third optical channel 38 provides an indirect view of a third screen segment 14 to the side of or to the rear of the third screen segment 14.

A fourth optical channel 42 is formed by a second portion of the top housing wall 20, the upper portion of the interior vertical partition 24, the second portion of the interior horizontal partition 26, a fourth exterior wall support in the form of a fourth wall panel 44, a third image-reversing mirror 54 attached an interior side of the fourth wall panel 44, and a fourth image-reversing mirror 56 attached to a second interior side of the interior vertical partition 24. The fourth optical channel 42 provides an indirect view of a fourth screen segment 14 to the side of or to rear of the fourth screen segment 14.

To use the embodiment of the invention shown in FIGS. 1–6, a first player sits in front of the first optical channel 30 and has a direct view of the first screen segment. A second player sits in front of the second optical channel 34 and has a direct view of the second screen segment. A third player sits in front of the third optical channel 38 and has an indirect view of the third screen segment via the first image-reversing mirror 50 and the second image-reversing mirror 52 which, together, provide a non-reversed image of the third screen segment. A fourth player sits in front of the fourth optical channel 42 and has an indirect view of the fourth screen segment via the third image-reversing mirror 54 and the fourth image-reversing mirror 56 which, together, provide a non-reversed image of the fourth screen segment. Each player can play one's respective portion of a four person video game without being confused by screen images seen by other players.

Turning to FIGS. 7 and 8, a second embodiment of the invention is shown. Reference numerals are shown that correspond to like reference numerals that designate like elements shown in the other figures. In addition, the upper portion of the interior vertical partition 24 is removable, the third wall panel 40 is removable, and the lower portion of the interior vertical partition 24 is connected by a hinge 25 to intermediate wall panel 27.

To convert the screen segment, viewing isolation apparatus 10 of the invention from one that provides four optical channels for viewing a video screen 12 divided into four quadrant-sized screen segments 14 into an apparatus that provides two optical channels for viewing a video screen 12 divided into two, stacked, half-screen sized screen segments 14, the upper portion of the interior vertical partition 24 is removed, the third wall panel 40 is removed, and the lower portion of the interior vertical partition 24 is moved around the hinge 25 towards the first wall panel 32 and away from the second wall panel 36. By removing the upper portion of the interior vertical partition 24 and by removing the third wall panel 40, a combination fifth optical channel 60 is created from the previously described third optical channel 38 and fourth optical channel 42. In addition, by moving the lower portion of the interior vertical partition 24 towards the first wall panel 32 and away from the second wall panel 36, a combination sixth optical channel 62 is created from the first optical channel 30 and the second optical channel 34. Both the fifth optical channel 60 and the sixth optical channel 62 provide for a direct view of the respective screen segments 14 of the video screen 12 from in front of the video screen 12.

The screen segment, viewing isolation apparatus 10 can also include adjustment leg assemblies 15 attached to the bottom housing wall 22 so that the apparatus can be raised and lowered to accommodate different video screens. Moreover, the screen segment, viewing isolation apparatus 10 can be constructed so that the apparatus can be adjusted for different size video screens.

The components of the screen segment, viewing isolation apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved screen segment, viewing isolation apparatus that is low in cost, relatively simple in design and operation, and which may advantageously be used without being attached to either a CRT or a CRT cabinet. With the invention, a screen segment, viewing isolation apparatus is provided which permits plural players to be present at the same location and to use the same video screen that is divided into separately viewable segments. With the invention, a screen segment, viewing isolation apparatus is provided which permits plural players to play simultaneously. With the invention, a screen segment, viewing isolation apparatus is provided which permits a number of persons to view a monitor without crowding one another.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A segment, viewing isolation apparatus for a video screen divided up into plural screen segments, comprising:
   a housing which includes a plurality of optical channels, wherein each of said optical channels is registrable with a respective screen segment.

2. The apparatus of claim 1 wherein said housing includes:
   a top housing wall,
   a bottom housing wall,
   exterior wall supports connected between said top housing wall and said bottom housing wall,
   an interior vertical partition connected between said top housing wall and said bottom housing wall at medial positions of said top housing wall and said bottom housing wall, and
   an interior horizontal partition connected between said exterior wall supports at medial positions of said exterior wall supports.

3. The apparatus of claim 2, further including:
   an intermediate wall panel connected between said top housing wall and said bottom housing wall, wherein said intermediate wall panel is connected to said interior vertical partition.

4. The apparatus of claim 2 wherein:
   said upper portion of said interior vertical partition is removable,
   said third wall panel is removable, and
   said lower portion of said interior vertical partition is connected by a hinge to said intermediate wall panel connected between said top housing wall and said bottom housing wall.

5. The apparatus of claim 4 wherein:
   a first optical channel is formed by a first portion of said bottom housing wall, a lower portion of said interior vertical partition, a first portion of said interior horizontal partition, and a first exterior wall support in the form of a first wall panel, wherein said first optical channel provides a direct view of a first screen segment from in front of the first screen segment,
   a second optical channel is formed by a second portion of said bottom housing wall, a lower portion of said interior vertical partition, a second portion of said interior horizontal partition, and a second exterior wall support in the form of a second wall panel, wherein said second optical channel provides a direct view of a second screen segment from in front of the second screen segment,
   a third optical channel is formed by a first portion of said top housing wall, an upper portion of said interior vertical partition, said first portion of said interior horizontal partition, a third exterior wall support in the form of a third wall panel, a first image-reversing mirror attached to an interior side of said third wall panel, and a second image-reversing mirror, and a second image-reversing mirror attached to a first interior side of said interior vertical partition, wherein said third optical channel provides an indirect view of a third screen segment to the side of the third screen segment, and
   a fourth optical channel is formed by a second portion of said top housing wall, said upper portion of said interior vertical partition, said second portion of said interior horizontal partition, a fourth exterior wall support in the form of a fourth wall panel, a third image-reversing mirror attached an interior side of said fourth wall panel, and a fourth image-reversing mirror attached to a second interior side of said interior vertical partition, wherein said fourth optical channel provides an indirect view of a fourth screen segment to the side of the fourth screen segment.

6. A screen segment, viewing isolation apparatus for use with a video screen displaying plural screen segments, said apparatus comprising:
   unattachable means for viewing said plural segments independently of each other by different viewers, respectively, said unattachable means comprising a first optical means for directly viewing one of said screen segments and second optical means for indirectly viewing another of said screen segments, said unattachable means being adapted to be located proximal to said video screen, and wherein said first optical means comprises means for viewing a first portion of said video screen along a first substantially straight path intercepting said video screen, and said second optical means comprises means for viewing a second portion of said video screen along a second angled path intercepting said video screen.

7. The apparatus of claim 6 wherein said second optical means comprises a first reflecting means disposed at an angle to said video screen and a second reflecting means disposed at an angle to said first reflecting means.

8. The apparatus of claim 7 wherein said unattachable means comprises a housing having a first portion for enclosing said first optical means and a second portion for enclosing said second optical means.

9. The apparatus of claim 8 wherein said housing includes a horizontal wall member for separating said first portion from said second portion.

10. The apparatus of claim 9 wherein said housing has a first front viewing and a second side viewing wall and wherein said first optical means intercepts said first viewing wall and wherein said second optical means intercepts said second side viewing wall, such that said housing permits a viewer to view said one of said screen segments when said viewer is positioned proximal to said front wall of said housing and said housing simultaneously permits another viewer to view said another of said screen segments when said another viewer is positioned proximal to said side wall of said housing.

11. The method of simultaneously viewing multiple segments displayed on a video screen comprising the following steps:

(a) providing video means having a screen and capable of displaying multiple screen segments, (b) providing means unattached to said video means having a first viewing aperture and a second viewing aperture such that said second viewing aperture is located at an angle with respect to said first viewing aperture, (c) positioning said means unattached to said video means relative to said video means such that said first viewing aperture is substantially parallel to said video screen and said second viewing aperture is substantially non-parallel to said video screen, (d) positioning a first observer proximal to said first viewing aperture, and (e) positioning a second observer proximal to said second viewing aperture.

12. The method of claim 11 wherein step (b) includes the following additional step:

(f) providing optical isolation means in said means unattached to said video means such that a screen segment visible through said first viewing aperture is not visible through said second viewing aperture and vice versa.

13. The method of claim 12 wherein said step (f) includes the following additional step:

(g) providing a direct viewing path between said first viewing aperture and said first observer in a first portion of said means unattached to said video means and providing an indirect viewing path between said second viewing aperture and said second observer in a second portion of said means unattached to said video means.

14. The method of claim 13 wherein said step (g) includes the following additional step:

(h) providing a first reflecting means in said indirect viewing path positioned at a first angle to said screen and positioning a second reflecting means in said indirect path positioned at a second angle relative to said first reflecting means.

* * * * *